(12) United States Patent
Wang et al.

(10) Patent No.: US 10,858,277 B2
(45) Date of Patent: Dec. 8, 2020

(54) REFINING GLASS WITH REDUCED PRESSURE

(71) Applicant: Owens-Brockway Glass Container Inc., Perrysburg, OH (US)

(72) Inventors: Zhongming Wang, Ypsilanti, MI (US); Nicholas A Schoenrock, Toledo, OH (US); Ya-Cheng Lin, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 233 days.

(21) Appl. No.: 15/922,543

(22) Filed: Mar. 15, 2018

(65) Prior Publication Data

US 2019/0284078 A1   Sep. 19, 2019

(51) Int. Cl.

| | | |
|---|---|---|
| *C03B 5/225* | (2006.01) |
| *C03B 5/26* | (2006.01) |
| *C03B 5/43* | (2006.01) |
| *C03B 5/23* | (2006.01) |
| *C03B 5/05* | (2006.01) |
| C03B 5/03 | (2006.01) |
| C03B 5/235 | (2006.01) |

(52) U.S. Cl.
CPC .............. *C03B 5/2252* (2013.01); *C03B 5/05* (2013.01); *C03B 5/2257* (2013.01); *C03B 5/23* (2013.01); *C03B 5/262* (2013.01); *C03B 5/43* (2013.01); *C03B 5/031* (2013.01); *C03B 5/2356* (2013.01); *C03B 2211/23* (2013.01)

(58) Field of Classification Search
CPC ..... C03B 5/2252; C03B 5/2257; C03B 5/225; C03B 7/20; C03B 7/09; C03B 7/084; C03B 7/16; C03B 7/08
See application file for complete search history.

(56) References Cited

U.S. PATENT DOCUMENTS 2,691,689 A * 10/1954 Arbeit ....................... C03B 5/26
                                                                          65/135.8
3,938,981 A    2/1976 St. John
4,559,072 A   12/1985 Harcuba
(Continued)

FOREIGN PATENT DOCUMENTS

DE    10055969 C1   5/2002
EP     1205445 A2   5/2002
(Continued)

OTHER PUBLICATIONS

International Search Report and Written Opinion, Int. Application No. PCT/US2019/021766, Int. Filing Day: Mar. 12, 2019, Applicant: Owens-Brockway Glass Container Inc, dated Jun. 24, 2019.

*Primary Examiner* — Erin Snelting

(57) ABSTRACT

An apparatus and methods of refining glass, in a multi-stage, downwardly cascading manner, include a melting chamber housing molten glass and having an outlet, a first refining chamber downstream from the melting chamber and having a first outlet and a first inlet below the outlet of the melting chamber, and a second refining chamber downstream from the first refining chamber and having a second outlet and a second inlet below the first outlet of the first refining chamber. The first refining chamber has a first negative pressure and the second refining chamber has a second negative pressure.

13 Claims, 2 Drawing Sheets

(56) References Cited

U.S. PATENT DOCUMENTS

| | | | |
|---|---|---|---|
| 4,798,616 A | 1/1989 | Knavish et al. | |
| 4,919,700 A | 4/1990 | Pecoraro et al. | |
| 6,739,152 B2 | 5/2004 | Jeanvoine et al. | |
| 7,134,300 B2 | 11/2006 | Hayes et al. | |
| 8,402,787 B2 | 3/2013 | Purnode et al. | |
| 10,183,884 B2 * | 1/2019 | Baker | F23D 14/58 |
| 2002/0029590 A1 | 3/2002 | Wilke et al. | |
| 2002/0062664 A1 | 5/2002 | Schmitt et al. | |
| 2007/0220923 A1 * | 9/2007 | Oakleaf | C03B 5/027 65/475 |
| 2008/0187686 A1 | 8/2008 | Rodriguez Cuartas et al. | |
| 2014/0245793 A1 | 9/2014 | Howse et al. | |
| 2015/0251941 A1 | 9/2015 | Clark | |

FOREIGN PATENT DOCUMENTS

| | | |
|---|---|---|
| JP | 2002193624 A | 7/2002 |
| WO | WO99/35099 | 7/1999 |

* cited by examiner

REFINING GLASS WITH REDUCED PRESSURE

This patent application discloses an apparatus and methods to refine molten glass. More particularly, this apparatus utilizes a series of reduced pressures to remove gases from a molten glass mixture.

BACKGROUND

Silica-based glass, such as soda-lime-silica glass, is prevalent in the manufacture of glass containers and other articles. Molten glass used to make such articles is conventionally prepared by melting various glass-forming materials in a furnace or tank at elevated temperature. The resulting molten glass typically contains gaseous inclusions, e.g., "blisters," "bubbles," or "seeds," which desirably are removed prior to forming the molten glass into the desired shape. The process of removing gaseous inclusions from molten glass is referred to as "refining," and conventionally involves continued heating of the molten glass at high temperatures and for long periods of time, which allows the gaseous inclusions to gradually rise to the surface of the molten glass and escape. This process can be undesirably slow and requires high-energy input to maintain the molten glass at a suitably high temperature.

BRIEF SUMMARY OF THE DISCLOSURE

The present disclosure embodies a number of aspects that can be implemented separately from or in combination with one another.

In accordance with one aspect of the disclosure, there is provided a method of refining glass in a multi-stage, downwardly cascading manner. The method includes, first, producing molten glass, or melting raw materials, in a melting chamber having an outlet (e.g. a material outlet). Second, the method includes passing the molten glass downstream from the melting chamber into a first refining chamber. The first refining chamber has a first outlet and a first inlet below the outlet of the melting chamber. The first refining chamber has a first negative pressure in the range of 1 to 760 Torr, including all ranges, subranges, and values therebetween. More specifically, the first negative pressure could be in the range of 400 to 700 Torr.

Third, the method includes passing the molten glass downstream from the first refining chamber into a second refining chamber having a second outlet and a second inlet below the first outlet of the first refining chamber. The second refining chamber has a second negative pressure in the range of 1 to 700 Torr, and being lower than the negative pressure in the first refining chamber.

After the molten glass passes from the second refining chamber, the method may include passing the molten glass to a third refining chamber having a third outlet and a third inlet below the second outlet of the second refining chamber. The third refining chamber has a third negative pressure in the range of 1 to 600 Torr, and being lower than the second negative pressure. Such pressure decreases can assist in evolving gaseous inclusions from the molten glass quickly, and reducing gaseous inclusions in the final molten glass product to exit the process. The melting chamber, the first refining chamber, the second refining chamber, and the optional third refining chamber define a flow path for quickly refining the molten glass.

In accordance with another aspect of the disclosure, there is provided an apparatus for refining glass in this multi-stage, downwardly cascading manner, as discussed above. The apparatus has a melting chamber and at least two refining chambers. The melting chamber houses molten glass and has an outlet to move the molten glass to the refining stage.

The first refining chamber is located downstream from the melting chamber and has a first outlet and a first inlet below the outlet of the melting chamber. A vacuum source maintains the first refining chamber at a first negative pressure in the range of 1 to 760 Torr. Downstream of the first refining chamber is the second refining chamber. The second refining chamber has a second outlet and a second inlet below the first outlet of the first refining chamber. Similarly to the first refining chamber, a vacuum source maintains the second refining chamber at a second negative pressure in the range of 1 to 700 Torr.

The apparatus may include a third refining chamber downstream from the second refining chamber. The third refining chamber has a third outlet and a third inlet below the second outlet of the second refining chamber. Similarly to the upstream refining chambers, the third refining chamber has a third negative pressure in the range of 1 to 600 Torr. Through this downwardly cascading system, the various stages and/or chambers of the apparatus assist in evolving gaseous inclusions to increase the speed at which the apparatus produces a refined glass melt.

BRIEF DESCRIPTION OF THE DRAWINGS

The disclosure, together with additional objects, features, advantages and aspects thereof, will be best understood from the following description, the appended claims, and the accompanying drawings, in which:

DETAILED DESCRIPTION

A general object of the present disclosure, in accordance with one aspect thereof, is to provide a melting system that has cascading chambers, in which the pressure is reduced at each subsequent or downstream chamber to reduce and/or substantially eliminate gaseous inclusions and bubbles in the final molten glass prior to forming the molten glass into the desired product shape. In order to do this, the method and apparatus may stimulate gas bubble evolution during refining so that the final molten glass contains fewer trapped gas bubbles and has a more uniform mixture.

For purposes of this disclosure, "about" or "substantially" mean that a given quantity is no more than 10%, preferably no more than 5%, more preferably no more than 1%, of a comparison or stated value (e.g. volumetric value in a molten or solidified state). For example, "substantially eliminating" gaseous inclusions means to reduce the volume of any remaining gaseous inclusions such that the volume of the total molten glass product with any remaining gaseous inclusions is no more than 10%, preferably no more than 5%, more preferably no more than 1% greater than the volume of the molten glass alone in the final product. This could be measured either in the molten state or after solidification of the glass into the desired product.

Figure 1:
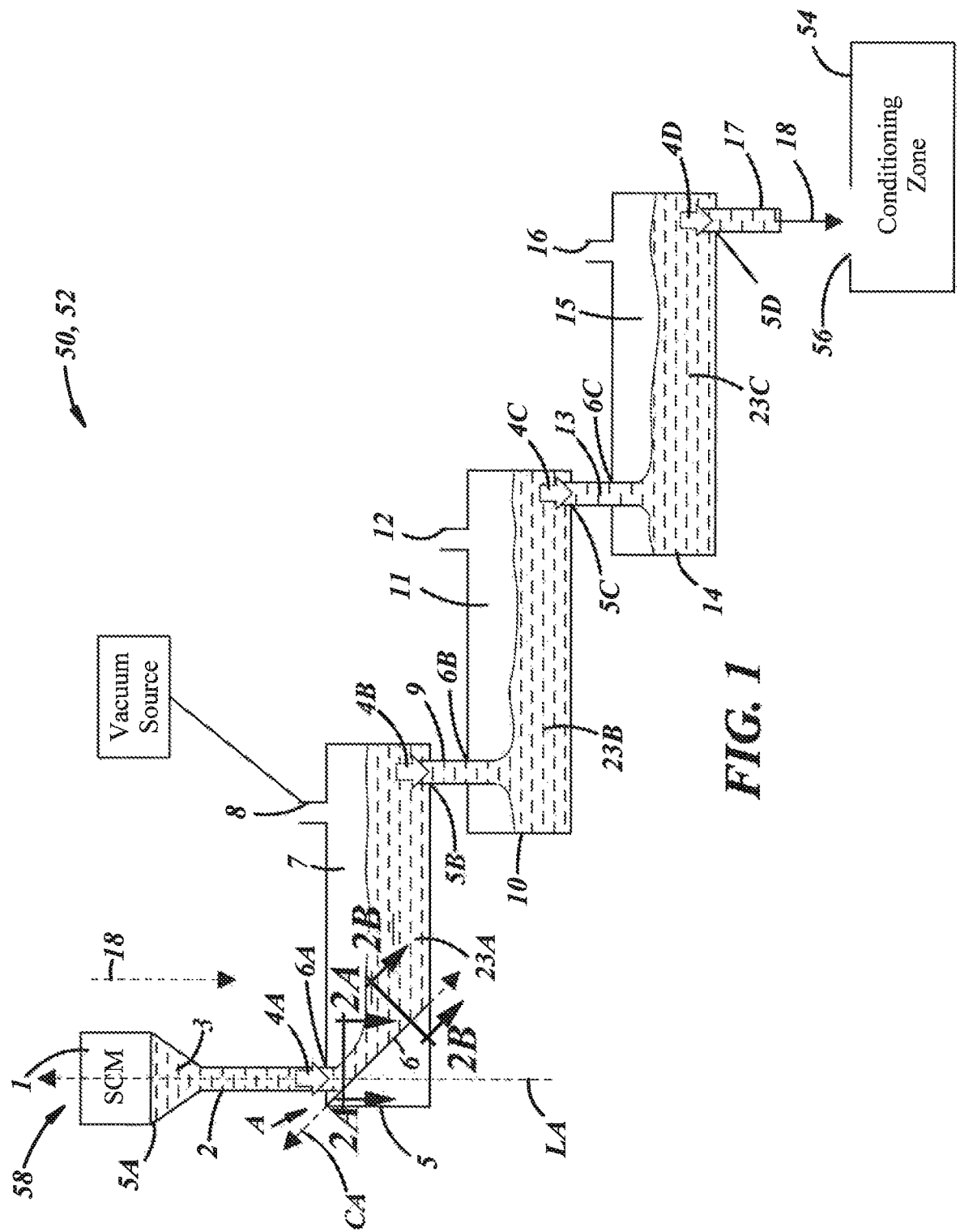
FIG. 1 depicts an overall view of the method and apparatus of melting chamber in accordance with an illustrative embodiment of the present disclosure.

FIG. 1 depicts an overall view of an apparatus 50 for melting raw materials into glass according to one aspect of the present disclosure. Along with the apparatus 50, FIG. 1 also depicts a method 52 of refining glass in a multi-stage, downwardly cascading manner. The apparatus 50 has four chambers (1, 5, 10, and 14) used in respective steps or stages of glass melting and/or refining. It will be understood that some of these chambers could be optional and additional chambers could be added, each having any or all of the features of the chambers discussed herein.

At a top or upper position, raw materials 58 are added to a melting chamber 1 or melter and melting commences. The heat generated in the melting chamber 1 can be generated by any known method, including fuel injection (discussed herein), electric heaters, burning natural gas, or other methods of generating thermal energy. Upon melting, the melting chamber 1 houses molten glass 3 and has an outlet or a molten material outlet 5A. The melting chamber 1 has or forms a longitudinal axis LA, which may be generally vertical in orientation as the molten glass 3 proceeds through the apparatus 50.

After melting begins and molten glass 3 is produced in the melting chamber 1, the molten glass 3 proceeds down a cascading flow path (as depicted with arrows 18). Gravity drives the molten glass 3 along the flow path; however, a plurality of plungers can also assist in driving the molten glass 3 along the path. For example, the molten glass 3 may enter a refractory or collecting funnel 2, situated along the flow path. A plunger 4A is housed at one end of the collecting funnel 2 and regulates how the molten glass 3 proceeds through the flow path. The plunger 4A may be mechanical or electrical driven, pneumatic or hydraulic to control the pull of the molten glass 3. It will be understood that any funnels (e.g. collecting funnel 2), pipes, and/or plungers (e.g. plungers 4A, B, C, and D) are optional elements of the apparatus 50, and, while they may provide increased control over the flow path, they may be omitted as desired.

Upon exiting the collecting funnel 2, the molten glass 3 proceeds or is passed into the first refining chamber 5, downstream from the melting chamber 1. The first refining chamber 5 has a first outlet or a first refiner outlet 5B and a first inlet or a first refiner inlet 6A below the molten material outlet 5A of the melting chamber 1. Upon entering the first refining chamber 5, the molten glass 3 contacts a declined refractory chute or plane 6. One of ordinary skill in this art will understand that the refractory chute 6 may be considered "declined" or "inclined" depending on the perspective within the apparatus (e.g. being upstream or downstream from the refractory chute 6). For example, upon leaving the melting chamber 1, the refractory chute 6 is declined along or forming a central axis CA. The declined refractory chute 6 extends into the first refining chamber 5 and along the flow path.

The central axis CA of the declined refractory chute 6 forms an angle A with the longitudinal axis LA (vertical direction) of the melting chamber 1. This angle preferably is between 0 degrees to 10 degrees, and facilitates a smooth transition of the molten glass 3 along the flow path from the melting chamber 1 to the first refining chamber 5. In some aspects, the angle can be 0 degrees to 20 degrees, including ranges, subranges, and values therebetween. This angled geometry may reduce air and combustion gases becoming trapped and forming gas bubbles in the molten glass as it proceeds from the melting chamber 1 to the first refining chamber 5. Further details regarding the declined refractory chute 6 will be discussed below with respect to FIGS. 2A-B.

Once in the first refining chamber 5, the molten glass 3 forms glass pool 23A. The first refining chamber 5 has or is maintained at a first negative pressure (shown as 7 in the figure) of 1 Torr to 760 Torr, including all ranges, subranges, and values therebetween. Specifically, this pressure could be between 400 to 700 Torr, including all ranges, subranges, and values therebetween. The first refining chamber 5 includes a vacuum port 8, which may house or is connected to a first vacuum source to produce the first negative pressure shown as 7 in the figure. The pressure lowers in each subsequent or downwardly cascading chamber to reduce gaseous inclusions in each subsequent glass pool. By using the sequential reduction in negative pressure, the refining chambers may operate at lower temperatures than traditional refiners. At each reduction in pressure in subsequent chambers, the volume of the trapped gases expands, allowing the bubbles to rise to the surface of the molten glass and escape, as explained in the ideal gas law:

$$PV = nRT$$

The molten glass exits the first refining chamber 5 at the first refiner outlet 5B, and enters or is passed into an optional refractory pipe 9. As with the declined refractory chute 6, any refractory pipes (e.g. refractory pipe 9) may be set at an angle of 0 to 20 degrees with the vertical axis, including all ranges, subranges, and values therebetween, to further reduce trapping of gases between chambers. For example, the angle may be greater than 0.

From the refractory pipe 9, the molten glass enters or is passed into the second refining chamber 10. Because each subsequent chamber is downstream of its adjacent chamber, gravity will primarily move or drive the molten glass along the flow path. Additionally or alternatively, as with the melting chamber 1, a respective plunger 4B may control the rate of flow of the molten glass between the first and second refining chambers (5, 10).

The second refining chamber 10, downstream from the first refining chamber 5, has a second refiner outlet 5C and a second refiner inlet 6B below the first refiner outlet 5B of the first refining chamber 5. The second refining chamber 10 houses a molten glass pool 23B and also contains a respective vacuum port 12, which can house or be connected to a second vacuum source (similar to the first refining chamber 5). The second vacuum source generates a second negative pressure 11 of 1 Torr to 700 Torr, including all ranges, subranges, and values therebetween. Specifically, this pressure could be between 200 to 600 Torr, including all ranges, subranges, and values therebetween. One of ordinary skill in the art will appreciate that the same vacuum source, with suitable downstream valving and the like, or different vacuum sources could be used to generate each respective negative pressure in each chamber. Molten glass from the molten glass pool 23B exits the second refining chamber 10 and the second refiner outlet 5C, and may enter a refractory pipe 13.

Upon exiting the second refining chamber 10, the molten glass enters or is passed into an optional third refining chamber 14. As discussed above, gravity and/or a respective plunger 4C may control the rate of flow of the molten glass between the second and third refining chambers (10, 14). The third refining chamber 14 is downstream of the second refining chamber 10, and has a third refiner outlet 5D and a third refiner inlet 6C below the second refiner outlet 5C of the second refining chamber 10. The third refusing chamber has a vacuum port 16, which houses or is connected to a third vacuum source that sets a third negative pressure 15 of 1 Torr to 600 Torr, including all ranges, subranges, and values therebetween. Specifically, this pressure could be between 100 to 500 Torr, including all ranges, subranges, and values therebetween. This vacuum source controls the pressure of the chamber atmosphere that contains molten glass pool 23C. With each reduction in pressure at each chamber, the molten glass contains fewer and fewer gaseous bubbles as the proceeding steps have evolved gases.

Regardless of the angle between the vertical axis and any refractory pipes connecting the chambers, the second refining chamber 10 is horizontally offset and vertically spaced from the first refining chamber 5. In one aspect, each subsequent chamber is not directly below the chamber immediately upstream thereof such that the molten material outlet 5A, the first refiner outlet 5B, the second refiner outlet 5C, and the third refiner outlet 5D are not arranged horizontally in-line with each other. Accordingly, the molten glass pool in each downwardly cascading chamber mixing thoroughly before it reaches the outlet to the next chamber. Of course, the outlets (5A, 5B, 5C, and 5D) and/or inlets (6A, 6B, 6C, and 6D) could be arranged horizontally in-line with each other.

Upon exiting the third refining chamber 14 via or by way of the third refiner outlet 5D, the molten glass may enter a refractory pipe 17, downstream of the third refining chamber 14. Gravity and/or a respective plunger 4D can control the molten glass flow rate upon exiting the third refining chamber 14.

The molten glass may then enter or pass into a conditioning zone 54, having a zone inlet 56 below the third refiner outlet 51) of the third refining chamber 14. In the conditioning zone 54, the molten glass further undergoes processing, refining, cooling and/or conditioning to prepare the molten glass for its use in forming glass containers and other various glass products.

The molten glass spends a time or duration in each chamber. For example, the steps of passing the molten glass downstream into each chamber may include the molten glass remaining in each chamber and/or the conditioning zone (1, 5, 10, 14, and 54) for a time of about 20 minutes to about 60 minutes, including all ranges, subranges, and values therebetween. The time spent in each chamber is sufficient to evolve gaseous inclusions and move the molten glass to the next stage.

The melting apparatus and method described herein may be used in submerged combustion melting (SCM). SCM is a type of melting used in glass manufacturing. In submerged combustion melting (SCM), an air-fuel or oxygen-fuel mixture is injected directly into a pool of raw materials within a melting chamber. Burners are arranged at the bottom and sides of the chamber beneath the top surface of the materials. The burners stimulate rapid melting of the raw materials by combustion of the fuel within the pool of raw materials. The combustion gases bubble through the raw materials, creating turbulent mixing of the raw materials at a high-heat transfer rate, melting the raw materials into a molten glass and also mixing the molten glass to create a homogeneous glass. Once the molten glass achieves a uniform composition, it can then drained from the chamber to be further processed and/or used to form desired products.

The SCM technique yields intense combustion and direct-contact heat transfer as combustion gases bubble through the raw materials and the molten glass, and a high rate of heat transfer, giving high thermal efficiency. Due to these advantages, SCM uses less energy to melt the raw materials and can utilize a smaller melter and/or furnace as compared to other melting methods. Likewise, the molten material spends less time in the melter and the materials are rapidly mixed. SCM systems can be simple and inexpensive because the SCM chamber is tolerant of a wide range of raw material batch and cullet size, can accept multiple types of raw material feeds, and does not require perfect feed blending prior to addition to the chamber.

The SCM melting method can suffer from excessive gas bubbling, which can cause difficulties in glass manufacturing. Due to the combustion gases, the molten glass can have high amounts of trapped gases that are slow to escape using traditional refining techniques, and which are desirable to be removed prior to forming the glass into the desired product shape. The technique and equipment discussed herein may be used to refine molten glass that has been produced by SCM melting or any other melting method. By using a series of refining chambers with progressively lower negative pressure as disclosed herein, a very low ultimate negative pressure may be achieved, which quickly removes entrained gas bubbles from the molten glass. The low negative pressure that is used in the disclosed progressive chamber system is not achievable when in a single stage refining chamber because use of a very low negative pressure causes intense foaming of the glass.

Figure 2A:
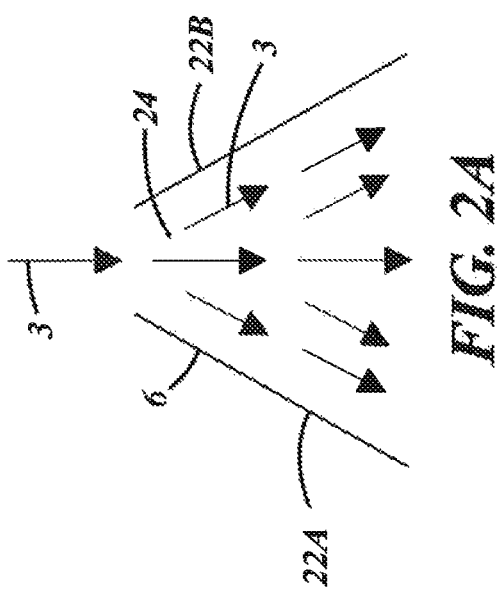
FIG. 2A depicts a top view of a declined refractory chute or plane as used in the apparatus and method of melting of FIG. 1, in accordance with an illustrative embodiment of the present disclosure.
Figure 2B:
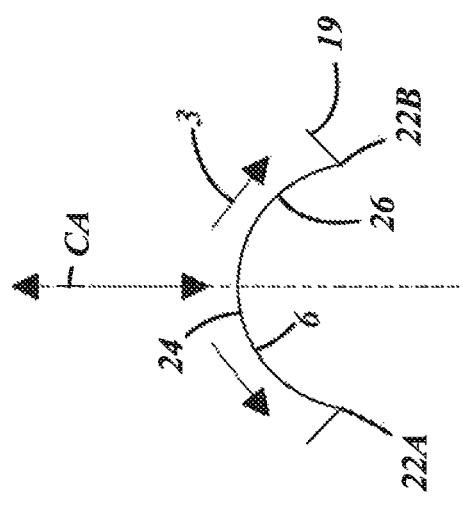
FIG. 2B depicts a side view of the declined refractory chute of FIG. 2A, in accordance with an illustrative embodiment of the present disclosure.

FIGS. 2A-B depict more details of the refractory chute 6. FIG. 2A depicts a top view of the refractory chute 6, along arrows 2A in FIG. 1. The refractory chute 6 directs or passes the molten glass 3 from the melting chamber 1 (FIG. 1) to the first refining chamber 5 (FIG. 1), generally in the direction of the arrows in FIG. 2A. The refractory chute 6 has an upper surface 24, a lower surface 26 (FIG. 2B), and a pair of side edges (22A, B). The upper surface 24 contacts the molten glass 3 as it proceeds downward along the flow path. The lower surface 26 opposes the upper surface 24 and is obscured in this view. The side edges (22A, B) oppose each other along the central axis.

FIG. 2B is a sectional view taken along arrows 2B in FIG. 1, and further depicts that the opposing upper and lower surfaces (24, 26) are excurvate, allowing the molten glass 3 to more softly contact the refractory chute 6, and move towards the side edges (22A, B). This curved geometry allows a uniform distribution of the molten glass 3 on the upper surface 24 as the contact surface area between the molten glass 3 and the upper surface 24 increases with increasing molten glass 3. Although contacting the refractory chute 6 can cause gas bubble generation, this geometry reduces and/or substantially prevents bubbles from being trapped in the molten glass 3 as it contacts or strikes the upper surface 24. Additionally, the curved, declined refractory chute 6 assists in removing bubbles that already exists in the molten glass 3 as the molten glass spreads out into a thinner layer and slides over the upper surface 24.

In this aspect, a pair of walls (e.g. wall 19) or side wings extend upwardly from the upper surface 24, such that each wall 19 extends from one respective side edge (e.g. 22B) and in a direction away from the excurvate upper surface 24. In this arrangement, the walls (e.g. 19) reduce or prevent the molten glass 3 from dripping or spilling down and/or over the refractory chute 6 and directly into the downstream chamber as the molten glass 3 passes along the refractory chute 6 and the flow path. While such dripping would normally produce bubbles, this geometry acts to minimize this bubble generation. One of ordinary skill in the art will understand that the details of the refractory chute 6 may be similar to any refractory pipes (e.g. refractory pipes 9, 13, and 17) between the chambers and/or conditioning zone (5, 10, 14, and 54) to facilitate smooth transitions and reduced gas bubble evolution at each downwardly cascading stage or step.

Figure 3:
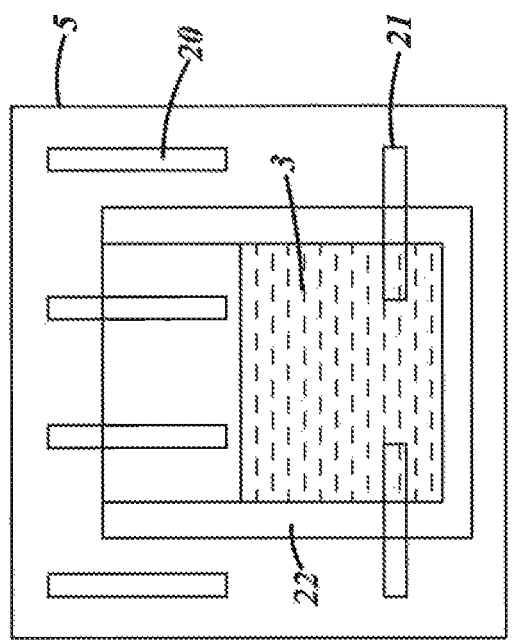
FIG. 3 depicts a cross-sectional view of a first refining chamber as used in the apparatus and method of melting of FIG. 1, in accordance with an illustrative embodiment of the present disclosure.

FIG. 3 depicts a cross-sectional view of the first refining chamber 5. The details discussed in this cross-sectional view can apply to any of the chambers and/or conditioning zone (1, 5, 10, 14, and 54). The first refining chamber 5 is made from a refractory material, having the ability to withstand high temperatures needed for glass refining. Exemplary materials are alumina-zirconia-silicate (AZS) blends. The first refining chamber 5 may have a sufficiently thick layer of such refractory material to prevent heat transfer to the surrounding environment and withstand the extreme temperatures. In one aspect, the temperature of the first, second, and third refining chambers (5, 10, 14) may be maintained between 1100° C. and 1550° C., including all ranges, subranges, and values therebetween. Specifically, the temperature could be between 1350° C. and 1450° C. By using progressively lower negative pressure in the second, third and any subsequent refining chambers, the second, third and subsequent refining chambers may operate at progressively lower temperatures, thus saving energy. The melting chamber may have a higher temperature to initially melt the raw materials into molten glass. Similarly, if the conditioning zone cools the molten glass, the temperature is reduced in the conditioning zone.

This constant temperature in the refining chambers can be maintained by one or more electrically-powered heating elements. More specifically, electrically-powered heating elements (e.g. 20) are positioned on top or above the molten pool in the first refining chamber 5 to maintain the temperature above the pool. Additionally, electrically-powered heating elements (e.g. 21) are submerged or inserted into the molten glass pool to maintain the temperature of the glass from within and/or below the glass pool itself. The above temperature and the glass temperature in one chamber may be the same or different, as maintained by the various heating elements. A refractory refining channel 22 partially surrounds or coats the bottom of the first refining chamber 5 to assist in maintaining molten glass flow and molten glass temperature.

There thus has been disclosed an apparatus and methods of refining glass in a multi-stage, downwardly cascading manner, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. An apparatus for refining glass in a multi-stage, downwardly cascading manner in which molten glass proceeds down a flow path driven by gravity, the apparatus comprising:

a melting chamber housing molten glass and having an outlet;

a first refining chamber downstream from the melting chamber and having a first outlet and a first inlet below the outlet of the melting chamber, the first outlet of the first refining chamber being spaced from the first inlet of the first refining chamber along the flow path, the first refining chamber having a first negative pressure of 1 to 760 Torr and including a declined refractory chute below the first inlet that extends into the first refining chamber along a central axis, the declined refractory chute having an excurvate upper surface, a lower surface, a pair of side edges between the upper and lower surfaces opposing each other along the central axis, and a pair of walls such that each wall extends upwardly from one respective side edge in a direction away from the excurvate upper surface; and a second refining chamber downstream from the first refining chamber and horizontally offset from the first refining chamber, the second refining chamber having a second outlet and a second inlet below the first outlet of the first refining chamber, the second outlet of the second refining chamber being spaced from the second inlet of the second refining chamber along the flow path, the second refining chamber having a second negative pressure of 1 to 700 Torr.

2. The apparatus of claim 1 further comprising a third refining chamber downstream from the second refining chamber and horizontally offset from the second refining chamber, the third refining chamber having a third outlet and a third inlet below the second outlet of the second refining chamber, the third outlet of the third refining chamber being spaced from the third inlet of the third refining chamber along the flow path, and the third refining chamber having a third negative pressure of 1 to 600 Torr.

3. The apparatus of claim 2 further comprising a conditioning zone downstream from the third refining chamber and having a zone inlet below the third outlet of the third refining chamber.

4. The apparatus of claim 1 wherein the melting chamber has a longitudinal axis such that the central axis of the declined refractory chute forms an angle with the longitudinal axis of about 0 to about 10 degrees.

5. The apparatus of claim 1 further comprising a plurality of plungers such that each of the outlet, the first outlet, and the second outlet are connected to one respective plunger that controls a respective flow rate of the molten glass.

6. An apparatus for refining glass in a multi-stage, downwardly cascading manner in which molten glass proceeds down a flow path driven by gravity, the apparatus comprising:

a melting chamber housing molten glass and having an outlet;

a first refining chamber downstream from the melting chamber and having a first outlet and a first inlet below the outlet of the melting chamber, the first refining chamber having a first negative pressure of 1 to 760 Torr and including a declined refractory chute below the first inlet, the declined refractory chute extending into the first refining chamber and along a central axis and having an excurvate upper surface, a lower surface, a pair of side edges between the upper and lower surfaces and opposing each other along the central axis, and a pair of walls such that each wall extends upwardly from one respective side edge and in a direction away from the excurvate upper surface; and a second refining chamber downstream from the first refining chamber and having a second outlet and a second inlet below the first outlet of the first refining chamber, the second outlet of the second refining chamber being spaced from the second inlet of the second refining chamber along the flow path, and the second refining chamber having a second negative pressure of 1 to 700 Torr.

7. The apparatus of claim 6 further comprising a third refining chamber downstream from the second refining chamber and having a third outlet and a third inlet below the second outlet of the second refining chamber, the third refining chamber having a third negative pressure of 1 to 600 Torr.

8. The apparatus of claim 7 further comprising a conditioning zone downstream from the third refining chamber and having a zone inlet below the third outlet of the third refining chamber.

9. An apparatus for refining glass in a multi-stage, downwardly cascading manner in which molten glass proceeds down a flow path driven by gravity, the apparatus comprising:
- a melting chamber having an outlet, wherein burners inject an air-fuel mixture or an oxygen-fuel mixture directly into a pool of raw materials contained within the melting chamber to produce molten glass;
- a first refining chamber downstream from the melting chamber and having a first outlet and a first inlet, the first inlet of the first refining chamber being below the outlet of the melting chamber and the first outlet of the first refining chamber being spaced from the first inlet of the first refining chamber along the flow path, the first refining chamber including a declined refractory chute below the first inlet of the first refining chamber, the declined refractory chute extending into the first refining chamber along a central axis and having an excurvate upper surface, a lower surface, a pair of side edges between the upper and lower surfaces and opposing each other along the central axis, and a pair of walls such that each wall extends upwardly from one respective side edge in a direction away from the excurvate upper surface, the first refining chamber having a first negative pressure of 1 to 760 Torr; and
- a second refining chamber downstream from the first refining chamber, the second refining chamber being horizontally offset and vertically spaced from the first refining chamber, the second refining chamber having a second outlet and a second inlet, the second inlet of the second refining chamber being below the first outlet of the first refining chamber and the second outlet of the second refining chamber being spaced from the second inlet of the second refining chamber along the flow path, the second refining chamber having a second negative pressure of 1 to 700 Torr.

10. The apparatus of claim 9 further comprising a third refining chamber downstream from the second refining chamber, the third refining chamber being horizontally offset and vertically spaced from the second refining chamber, the third refining chamber having a third outlet and a third inlet, the third inlet of the third refining chamber being below the second outlet of the second refining chamber and the third outlet of the third refining chamber being spaced from the third inlet of the third refining chamber along the flow path, the third refining chamber having a third negative pressure of 1 to 600 Torr.

11. The apparatus of claim 10 further comprising a conditioning zone downstream from the third refining chamber and having a zone inlet below the third outlet of the third refining chamber.

12. The apparatus of claim 10 wherein the third negative pressure is lower than the second negative pressure, and wherein the second negative pressure is lower than the first negative pressure.

13. The apparatus of claim 9 wherein the second negative pressure is lower than the first negative pressure.

* * * * *